United States Patent [19]
Bailleul et al.

[11] Patent Number: 5,808,562
[45] Date of Patent: Sep. 15, 1998

[54] VEHICLE DETECTOR FOR INSTALLATION ON THE SURFACE OF A MULTI-LANE ROAD

[75] Inventors: Gilles Bailleul, Dunwoody; Patrick Coville, Le Chesnay, both of France

[73] Assignee: U.S. Philips Corporation, NY, N.Y.

[21] Appl. No.: 943,792

[22] Filed: Sep. 11, 1992

[30] Foreign Application Priority Data

Sep. 25, 1991 [FR] France ................................. 91 11828

[51] Int. Cl.⁶ .................................................. G08G 1/01
[52] U.S. Cl. ........................ 340/933; 340/941; 340/596; 340/665; 340/666; 310/338; 174/102 R; 29/828
[58] Field of Search .................... 340/595, 596, 340/598, 665, 666, 933, 940, 941, 942, 943; 310/44, 320, 338, 358

[56] References Cited

U.S. PATENT DOCUMENTS

| | | | |
|---|---|---|---|
| 2,875,354 | 2/1959 | Harris | 310/358 |
| 3,911,390 | 10/1975 | Myers | 340/940 |
| 4,227,111 | 10/1980 | Cross et al. | 310/358 |
| 4,341,974 | 7/1982 | Calderara | 310/338 |
| 4,495,434 | 1/1985 | Diepers et al. | 310/338 |
| 4,901,334 | 2/1990 | Gibson | 340/940 |
| 5,008,666 | 4/1991 | Gebert et al. | 340/936 |
| 5,126,615 | 6/1992 | Takeuchi et al. | 310/358 |
| 5,142,187 | 8/1992 | Saito et al. | 310/358 |

FOREIGN PATENT DOCUMENTS 0287250  10/1988  European Pat. Off. .

*Primary Examiner*—Jeffery Hofsass
*Assistant Examiner*—Daryl C. Pope
*Attorney, Agent, or Firm*—Norman N. Spain; Paul Miller; William L. Botjer

[57] ABSTRACT

A vehicle detector for installation on the surface of a multi-lane road, comprising at least a coaxial detector cable provided with a central conductor, a metallic cladding and a filler material between the cladding and the conductor. The coaxial detector cable comprises at least one region which is referred to as the active region and in which the filler material is mechanoelectric, and also comprises at least one adjoining region which is referred to as a neutral region and in which the filler material is neither mechanoelectric nor potentially mechanoelectric.

7 Claims, 2 Drawing Sheets

VEHICLE DETECTOR FOR INSTALLATION ON THE SURFACE OF A MULTI-LANE ROAD

FIELD OF THE INVENTION

The invention relates to a vehicle detector for installation on the surface of a multi-lane road, including at least a coaxial detector cable which comprises a central conductor, a metallic cladding and a filer material between the cladding and the conductor.

The invention is used to count vehicles on roads or highways comprising several lanes, for example five or more lanes.

BACKGROUND OF THE INVENTION

Three categories of vehicle detectors are already known from the prior art.

The first category is formed by visual detectors which are not appropriate for a multi-lane road because several vehicles could simultaneously pass the detector, thus masking one another.

The second category is formed by detectors which are simply arranged on the road. This category involves, for example a piezoelectric film strip. This kind of device has a rather limited service life because of the fragility of the connection between the piezoelectric film and the connection cable to the recording device which is generally arranged on the shoulder of the road. This category also includes pneumatic tubes which are also fragile and which are active over their entire length, so that the amount of traffic on each of the lanes of a multi-lane road cannot be separately detected.

The third category is formed by detectors which are embedded in the road. This category includes, for example the device described in the document EP-A-0 287 250. The known device comprises an anchoring layer which is provided on the walls of a groove formed in a road and also comprises, disposed between a piezoelectric detector and said layer, one or more resins which envelop the detector. It also comprises a metallic profile around the piezoelectric detector and embedded in the filler materials. It is to be noted that the piezoelectric detector cable of the latter device is formed by a cable filled with a mechanoelectric material. A mechanoelectric material is to be understood to mean herein, for example a piezoelectric material, a triboelectric material, a magnetostrictive material or an electrostrictive material.

The devices of the third category have a common aspect in that they are mechanically resistant in time. Therefore, they may be permanently installed on a road. However, the types utilizing resins for enclosing piezoelectric sensors incur temperature problems when the weather conditions of the region in which they are installed vary. Eventhough the devices of the third category seem to be the only devices offering a satisfactory performance, they nevertheless have a serious drawback: their installation in the road necessitates work which on the one hand degrades the road to a given extent and which on the other hand is time-consuming.

Thus, the problem is to install vehicle detectors on highways or roads comprising several lanes (for example five or more) as is very common in the United States of America. The increased road traffic all over the world leads to the building of highways or roads which are ever larger and comprise a large number of lanes in each direction, and also to a need for the authorities responsible for road transport to have a better knowledge of the traffic; the latter is necessary for the design of the road, for improvement of the traffic flow, and for the realisation of automatic toll stations. Thus, in the case of a highway carrying dense traffic and comprising a plurality of lanes, it is practically impossible to close it to the traffic flow for a period of time long enough to install embedded sensors of the cited third category, the more so because often a single on-site study of the traffic suffices to collect the data necessary for evaluation or better understanding of the traffic. Therefore, use must be made of a detector arranged on the surface of the road.

A detector for arrangement on the surface of a road is also known from the document EP-A-0 287 250, notably from the FIGS. 3 and 4 thereof. The detector cable used in EP-A-0 287 250 can be embedded as well as installed on the surface and comprises a cladding, a central conductor and a mechanoelectric filler material.

Nevertheless, none of the known devices offers a solution when a vehicle detector is required which can be simply arranged on the surface of a multi-lane road, implying a very fast installation, and which is particularly appropriate to supply differentiated data for each of the lanes of the road which presumably carries dense traffic, even if these properties are opposed by the fact the installation is only temporary because the device has a comparatively short service life due to the heavy traffic, be it that said service life should be sufficiently long to enable acquisition of the desired data.

Therefore, a technical problem to be solved by the invention is to provide a vehicle detector, possibly for temporary installation, which is to be arranged on the surface of a multi-lane road, easy to secure in the selected location, interferes as little as possible with the traffic during its installation and does not at all interfere with the traffic during its use, supplies selective data associated with each of the lanes of the road, with as little as possible interference with the data, considered to be stray data, originating from other lanes, and does not comprise any connector whatsoever in the part exposed to the traffic.

SUMMARY OF THE INVENTION

In accordance with the invention, the described problems are solved by means of a detector as defined in the introductory part of claim 1 and characterized in that the coaxial detector cable comprises at least one region which is referred to as the active region and in which the filler material is of a mechanoelectric type, and at least one adjoining region which is referred to as the neutral region and in which the filler material is neither mechanoelectric nor potentially mechanoelectric.

In one embodiment of the invention, the filler material of the active region is formed by a powdery piezoelectric ceramic material and the filler material of the neutral region (regions) is formed by a powdery insulating mineral.

In a preferred embodiment of the invention, the powdery piezoelectric ceramic material is chosen from a mixture of titanate and lead zirconate or of barium titanate doped with lead titanate, the powdery insulating mineral being chosen from magnesium (MgO), silicon ($SiO_2$) or aluminium ($Al_2O_3$) or a mixture of several insulating minerals comprising one of these powders.

BRIEF DESCRIPTION OF THE DRAWINGS

The invention will be described in detail hereinafter with reference to the accompanying diagrammatic drawings; therein

DESCRIPTION OF PREFERRED EMBODIMENTS

Figure 1:
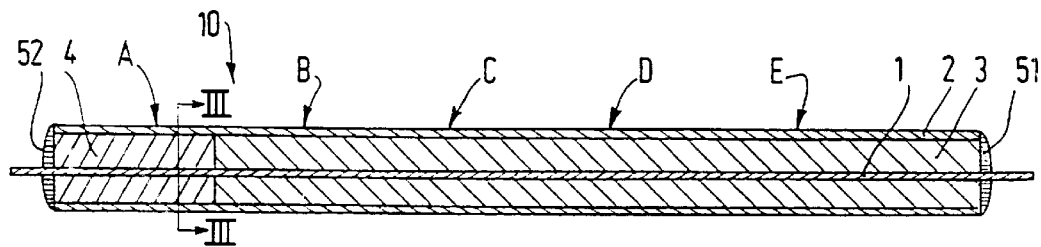
FIG. 1 is a transverse sectional view of a first embodiment of a detector cable.
Figure 2:
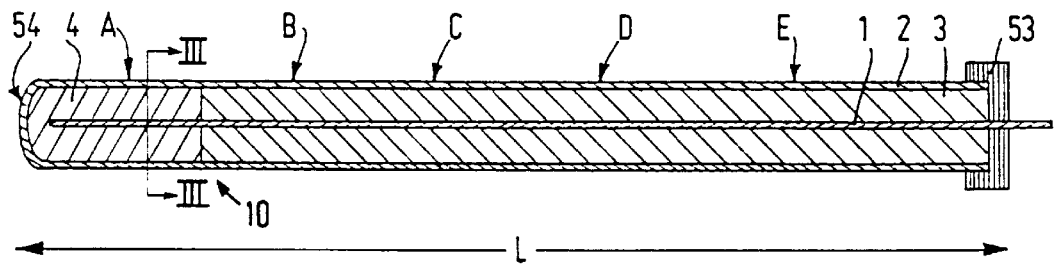
FIG. 2 is a longitudinal sectional view of a second embodiment of a detector cable.
Figure 3:
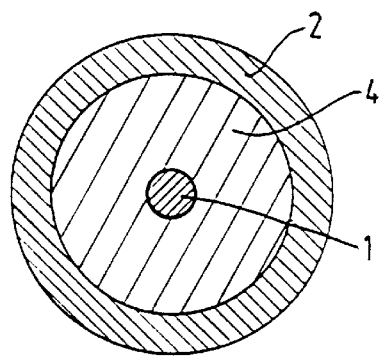
FIG. 3 is a transverse sectional view of a detector cable.

As appears from the longitudinal sectional views of the FIGS. 1 and 2 and the transverse sectional view of FIG. 3, the detector cable 10 comprises essentially a coaxial structure which is formed by a central conductor 1, a metallic cladding 2 and a powdery filler material 3, 4 which is provided between the central conductor 1 and the cladding 2.

Figure 4:
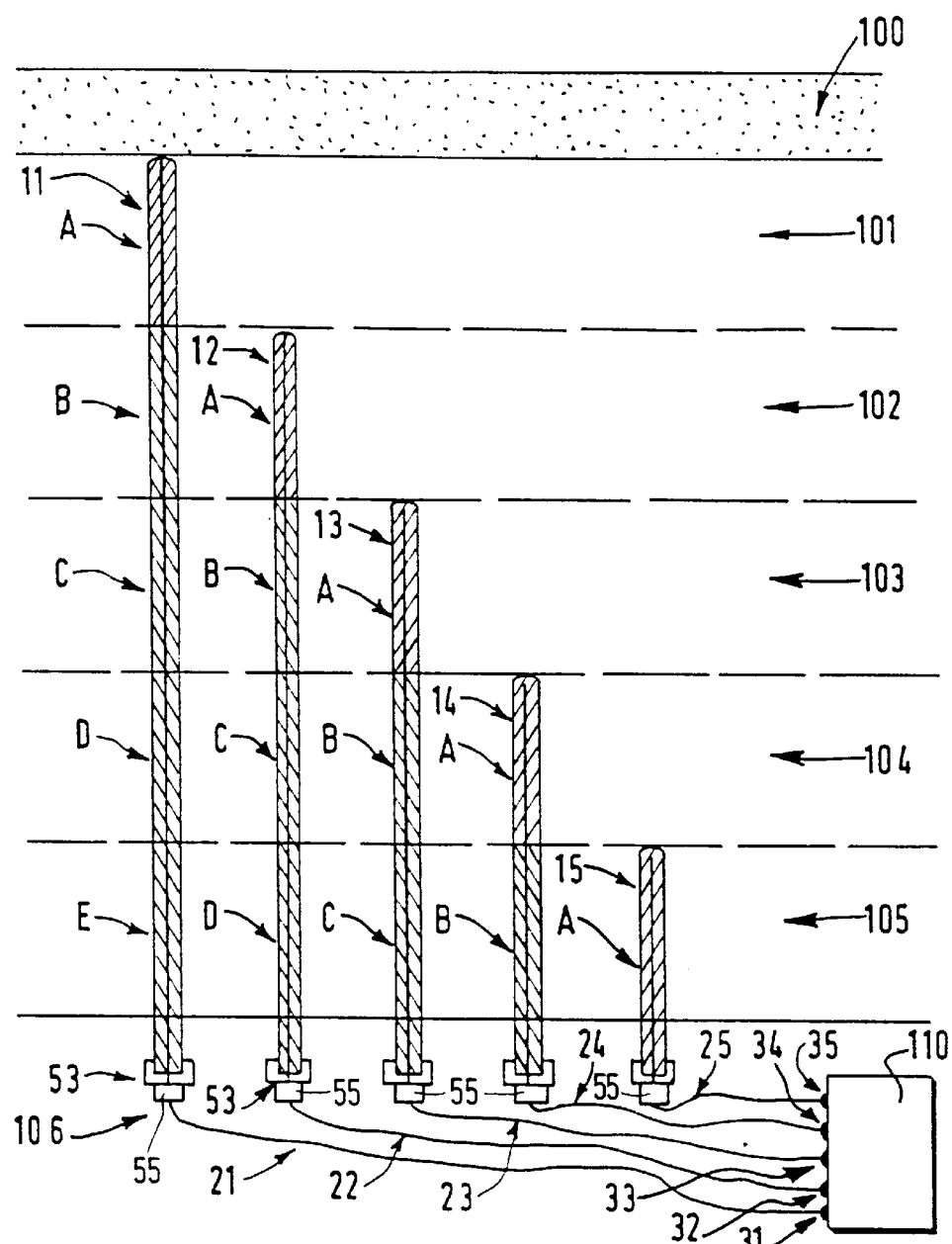
FIG. 4 is a plan view of one side of a five-lane highway extending, in one traffic direction, between the central reservation and the shoulder.

The cable has a length L which suffices to extend across one or more lanes of a multi-lane road, for example so as to be used on a highway having from 2 to 10 lanes. Thus, FIG. 4 is a plan view of one side of a highway, comprising five lanes in one direction of traffic, between the central reservation 100 and the shoulder 106. FIGS. 1 and 2 show two respective embodiments of the cable 10 suitable for the detection of vehicles travelling on the fifth lane 101, counting from the shoulder of the highway, it being assumed that the electronic recording device 110 for the data acquired is arranged on the shoulder 106 of the highway as shown in FIG. 4. In another application of the vehicle detector, the electronic data recording device 110 could be arranged on the central reservation 100.

Referring to the FIGS. 1 and 2, the cable 10 has a length L which suffices to cover the 5 lanes of the highway, that is to say a length of approximately 20 m. After installation of the vehicle detector across the highway, the sections A, B, C, D, E of the cable will correspond to the lanes 101, 102, 103, 104 and 105, respectively, which are diagrammatically shown in FIG. 4.

For the detection of vehicles on the fifth lane 101, only the part A of the cable 10 should provide a piezoelectric effect; this effect should extend radially, i.e. according to the radius of the cable which is shown in a sectional view in FIG. 3. The other parts B, C, D etc, provided between the lane in which the measurements are performed and the shoulder 106 of the highway, must be neutral and notably should not emit parasitic signals stemming from the passage of vehicles in the lanes 102 and 103, etc. Therefore, during the formation of the cable 10, exclusively the part A is doped with a potentially piezoelectric filler material 4. The other parts B, C, D, etc are doped with a completely neutral filler material 3.

The manufacturing process for the cable 10 includes the formation of a cable blank whose diameter may be from 0.5 to 3 cm. The blank comprises the metallic cladding 2, the central conductor 1 and the powdery filler materials 3 and 4 which are distributed over the length of the blank as a part corresponding to A for the potentially piezoelectric material and four parts corresponding to B, C, D, E for the neutral material. The blank is subsequently subjected to drawing, lamination and annealing operations in order to impart the appropriate diameter and length to the coaxial cable for the vehicle detector. To this end, the powders are compacted in the various parts of the cable. The ultimate diameter is between 1 and 3 mm, and the length is in the order of 20 m for the exemplary case of a cable for 5 lanes.

As is shown in a longitudinal sectional view in FIG. 1, each of the ends 51, 52 is sealed by means of a tight insulating cap allowing the passage of a part of the central conductor 1.

As appears from the longitudinal sectional view of FIG. 2, the cladding 2 is completely closed at one of the ends 54, without contacting the central conductor 1, and at its other end there is provided a tight insulating cap 53 which allows passage of a part of the central conductor 1.

In both cases, one of the ends where the central conductor 1 is present is provided with a coaxial connector which may be, for example a BNC-type connector. Preferably, the coaxial cable for the vehicle detector is connected, VIA said connector, to a transmission cable which is denoted by the references 21, 22, 23, 24 and 25 in FIG. 4 and which is commercially available from THERMOCOAX (Suresnes-France) under the code RG58 Cu.

Various examples of products for forming the various parts of the coaxial cable 10 will be given hereinafter.

EXAMPLE I

The central conductor 1 as well as the external conductive cladding 2 may be made of copper. The potentially piezoelectric part A may contain the powdery filler material chosen from already commercially available piezoelectric ceramic materials, for example the material $PEX_5$ marketed by Philips (the Netherlands), on the basis of which there is obtained a powdery mixture of titanate and lead zirconate having a Curie point of 285° C. The neutral parts are preferably filled with a powdery insulating mineral chosen from magnesium $MgO$, silicon $SiO_2$, aluminium $Al_2O_3$.

EXAMPLE II

The central conductor 1 as well as the external conductive cladding 2 may be made of copper. The potentially piezoelectric filler material for the active part A may be chosen from:

a mixture of titanate and lead zirconate or barium barium titanate doped with a few % of lead titanate, for example 5%.

If the potentially piezoelectric material were to contain only a single titanate, it would be more readily depolarized after its polarization.

EXAMPLE III

The central conductor 1 and the metallic cladding 2 may be made of materials other than copper, for example titanium. However, titanium is more expensive than copper. Therefore, notably an inexpensive metal is pursued because the detector cable in accordance with the invention is often intended for temporary use, that is to say non-reusable use, for a period of a few days or approximately a week of installation at a given site.

EXAMPLE IV

In combination with the conductor 1 and the cladding 2 made of a metal of the foregoing examples, filler materials chosen from the polymers can be used. Thus, for the potentially piezoelectric part A the filler material could be chosen from the PVDF materials, being commercially available fluoropolymers from ATOCHYEM (ELF-ACQUITAINE, USA). For the neutral parts B, C, D etc, for example a polyethylene is then chosen.

When the blank has been mechanically and thermally treated so as to obtain the coaxial structure desired for use in the vehicle detector, its potentially piezoelectric part is subjected to the polarization operation. This operation consists in the application of a strong electric field to the coaxial structure, the latter being at the same time heated to a temperature in the vicinity of the Curie point of the piezoelectric material. For application as a vehicle detector, the polarization must be radial. To this end, a direct voltage of appropriate value is applied between the cladding and the central conductor. For carrying out the various steps required to obtain the operational piezoelectric coaxial structure from the blank, those in skilled in the art can consult Patent FR 2 109 176. At this stage the importance of the differentiation of the filler material 4 of the active part, exhibiting the piezoelectric effect, and the completely neutral filler material 3 of the other parts B, C, D etc. becomes apparent.

Actually, if the entire coaxial structure were filled with a potentially piezoelectric material, that is to say all parts A as well as B, C, D, etc. and if only the desired part A were subjected to the polarization process during manufacturing, the cable would at least have the following drawbacks.

On the one hand, it would have a very high capacitance which is very detrimental to the processing of the signal acquired by a system 110 (see FIG. 4) which includes a signal amplifier, as will be known to those skilled in the art, for the acquisition of the information relating to the road traffic.

On the other hand, the parts B, C, D etc. which are to be neutral would be slightly sensitive, even though they have not been subjected to the polarization process. In that case it would be very difficult to distinguish between a parasitic signal and an attenuated signal. An attenuated signal is to be understood to mean a signal produced by a light vehicle in the active part A and a parasitic signal is to be understood to be a signal produced by a heavy truck in one of the neutral parts B, C, D etc.

FIG. 4 is a diagrammatic plan view of the assembly of elements of a detector for a five-lane highway. This detector comprises a first coaxial detector cable 11 which is analogous to the cable 10 of the FIGS. 1, 2 and 3 and which comprises, for example an active part A having a length of approximately 3.5 m for installation across the lane 101 which is situated furthest from the shoulder 106; it also comprises neutral parts B, C, D, E which have a respective length of approximately 3.5 m and which are to be installed across the lanes 102, 103, 104, 105. A coaxial connection cable, denoted by the reference 21 and connected to the end 53 by way of a coaxial connector 55, transports the signals relating to the active part A to an input 31 of an electronic processing device 110. The connector 55, the connection cable 21 and the electronic device 110 are arranged on the shoulder 106 so as to be remote from the traffic. Evidently, in another application the device 110 could be arranged on the central reservation 100 of the relevant highway and in that case the coaxial cable 11 would be arranged the other way around.

The detector also comprises a coaxial detector cable 12 of the same type as the cable 10 described above, comprising an active part A which is arranged across the fourth lane from the shoulder in the present example and which comprises only three neutral parts B, C, D across the lanes 103, 104, 105. A connection 22, 55, analogous to that described above, connects the end 53 of the structure 12 to the input 32 of the device 110.

The detector also comprises detector cables 13, 14, 15, each of which comprises an active part A and two neutral parts B, C, one neutral part B, and no neutral part, respectively, each detector cable comprising a connection cable 23, 24, 25, respectively, for connection to the inputs 33, 34, 35, respectively, of the device 110.

The external neutral parts, that is to say E, D, C, B of the cables 11, 12, 13, 14 for traversing the lane 105 may be longer than those provided across the other parts, so that the end 53 can be situated well outside the traffic flow and on the shoulder. Similarly, the structure 15 which in theory comprises only an active part A may comprise a neutral part between the part A and the end 53 for the same reason.

The coaxial extension cables 21, 22, 23, 24, 25 may have a length of as much as 20 m. The advantages offered by a detector composed of the described elements are the following:

a) The coaxial detector cables 11, 12, 13, 14, 15 have capacitances which are as low as possible; the neutral parts do not exceed 300 pF/m in the case of magnesium and 100 pF/m in the case of polyethylene. This reduction of the capacitance represents a substantial improvement with respect to the case where use is made of a structure comprising a potentially piezoelectric material over its entire length, resulting in a capacitance of 10000 pF/m.

b) The transmitted signals, relating to each lane 101, 102, 103, 104, 105, are not affected by the traffic on the other lanes; this is due to the parts comprising a filler material consisting of completely neutral products.

c) All connections are situated outside the traffic flow on the shoulder or the central reservation: no connector is arranged on the road.

d) The detector can be installed on any highway, regardless of the number of lanes. It suffices to realise, outside the active part A, an adequate length of the neutral parts B, C, D, etc. Structures for highways comprising 10 lanes have already been tested.

e) Each part, be it active or neutral, may have a length appropriate for the chosen application, since the highways to be equipped with the detector may have more or less wide lanes, notably at the area of toll stations.

f) Each structure can be very quickly attached to the road surface, the traffic flow being interrupted only during a minimum period of time.

g) The coaxial cables 11, 12, 13 etc. have been tested on highways carrying very dense traffic. They have a service life in the order of 1 week on average, which is generally sufficient to carry out a traffic study. They may have a much longer service life in the case of less dense or less fast traffic.

h) The coaxial cables are very inexpensive. Therefore, they may be considered to be temporary or disposable cables suitable for one use only.

Hereinafter two methods of attaching the cables 11, 12, 13, etc across the road will be described by way of example; in this context, an inexpensive or disposable vehicle detector with a short service life is used.

Figure 5:
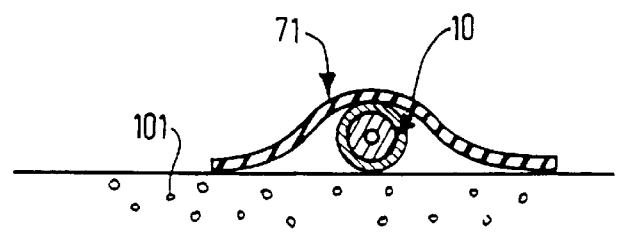
FIG. 5 is a transverse sectional view of a detector cable provided on a road simply by way of an adhesive tape.

FIG. 5 is a transverse sectional view of a coaxial detector cable 10 which may take the shape 11, 12, 13 etc and which is simply arranged on a road, for example across the lane 101, the cable being attached by means of an adhesive tape 71, for example chosen from the adhesive tapes which are based on polymers and which are intended especially for roads. The tape is preferably provided over the entire length L of the coaxial structure 10.

Figure 6:
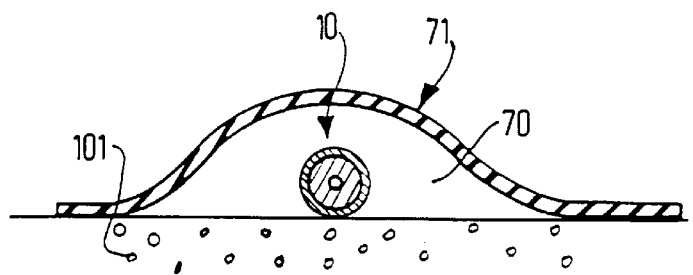
FIG. 6 is a transverse sectional view of a detector cable provided on a road, by way of an adhesive tape, after its encapsulation in a profile or an elastic tube.

FIG. 6 is a transverse sectional view of a coaxial detector cable 10 before encapsulation in a profile 70 or in a tube of an elastic synthetic material which does not eliminate the radial vibrations to be transmitted to the cable 10. The profile 70 is preferably provided over the entire length L of the cable 10 and the assembly is retained on the road by way of an adhesive tape 71.

In addition to these two examples of fixation, the cables 10 can be simply glued onto the road by means of, for example, resins which polimerize very quickly at ambient temperature. Since, the cables 10 have a very small diameter, being less than or equal to 3 mm, they can be easily attached.

The service life of the detector on the road depends mainly on the principle of attachment chosen. It is often desirable to minimize the visibility of the cables 10 in order to avoid sabotage. In that case the method illustrated with reference to FIG. 5 seems to be most appropriate. It will be evident that, in order to achieve a longer service life, the cables 10 can also be embedded. In that case they no longer have the advantage of fast installation, but the other qualities as mentioned sub a) to e) are retained.

The detectors in accordance with the invention are also suitable for other applications, for example the weighing of vehicles.

We claim:

1. A vehicle detector for installation on the surface of a multi-lane road comprising N lanes, said detector comprising at least a coaxial detector cable for monitoring the $M^{th}$ lane of the road, where $1 \leq M \leq N$, the cable comprising an active region whose length substantially equals the transverse dimension of the lane to be monitored, and an adjoining neutral region whose length at least equals the overall transverse dimension of the remaining $M-1$ other lanes when M is greater than 1 or a length greater than zero when M is equal to 1, the cable being constructed as a unitary structure comprising a central conductor, a metallic cladding and a filler material between the cladding and the conductor, the filler material in the active region being of a mechanoelectric type and the filler material in the neutral region being non-mechanoelectric.

2. A detector as claimed in claim 1, characterized in that for the monitoring of each of the N lanes of a road, the detector comprises N coaxial cables, each of said cables being defined by a parameter M with $1 \leq M \leq N$.

3. A detector as claimed in the claim 1, characterized in that the cable also has a neutral part at one of its ends, which neutral part comprises a coaxial connection system for connecting the detector to a data processing device.

4. A detector as claimed in claim 3, characterized in that the connection system comprises a coaxial connector and a coaxial cable for connection to the data processing device.

5. A detector as claimed in claim 1, characterized in that in the coaxial detector cable the filler material of the active region is formed by a powdery piezoelectric ceramic material, the filler material of the neutral region being a powdery insulating mineral.

6. A detector as claimed in claim 5, characterized in that the powdery piezoelectric ceramic material is chosen from a mixture of titanate and lead zirconate or barium titanate doped with lead titanate, and in that the powdery insulating mineral is chosen from oxides of magnesium or silicon or aluminium or a mixture of several insulating minerals containing one of these powders.

7. The use of a detector as claimed in claim 1, characterized in that the detector is connected to a data processing device, arranged on the shoulder of the road or on the central reservation, by way of a connection system connected to the end of the neutral part of the coaxial detector cable (cables), in that the cable (cables) is (are) arranged across the surface of the road, in that the active part of each cable covers one lane while its neutral part covers the other lanes between the active part and the zone without road traffic in which the data processing device is arranged, and in that the connection system between the coaxial piezoelectric cable (cables) and the data processing device is also installed in said zone without road traffic.

* * * * *